United States Patent
Angst et al.

(10) Patent No.: US 8,989,193 B2
(45) Date of Patent: *Mar. 24, 2015

(54) FACILITATING INSERTION OF DEVICE MAC ADDRESSES INTO A FORWARDING DATABASE

(71) Applicant: International Business Machines Corporation, Armonk, NY (US)

(72) Inventors: Debra L. Angst, Rochester, MN (US); Claude Basso, Nice (FR); Josep Cors, Rochester, MN (US); David A. Shedivy, Rochester, MN (US); Colin B. Verrilli, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 58 days.

This patent is subject to a terminal disclaimer.

(21) Appl. No.: 13/770,171

(22) Filed: Feb. 19, 2013

(65) Prior Publication Data

US 2014/0079064 A1    Mar. 20, 2014

Related U.S. Application Data

(63) Continuation of application No. 13/617,290, filed on Sep. 14, 2012.

(51) Int. Cl.
| | |
|---|---|
| *H04L 12/28* | (2006.01) |
| *H04L 12/743* | (2013.01) |
| *H04L 12/933* | (2013.01) |
| *H04L 12/721* | (2013.01) |
| *H04L 29/08* | (2006.01) |
| *H04L 12/947* | (2013.01) |

(52) U.S. Cl.
CPC ........ *H04L 45/7453* (2013.01); *H04L 49/1507* (2013.01); *H04L 45/44* (2013.01); *H04L 67/1065* (2013.01); *H04L 45/66* (2013.01); *H04L 49/25* (2013.01)
USPC ..................................... 370/392; 370/395.32

(58) Field of Classification Search
CPC ... H04L 45/74; H04L 45/745; H04L 45/7453; H04L 45/66; H04L 49/25; H04L 67/1065
USPC ............................... 370/392, 395.31, 395.32
See application file for complete search history.

(56) References Cited

U.S. PATENT DOCUMENTS

| | | | | |
|---|---|---|---|---|
| 6,141,738 | A | * | 10/2000 | Munter et al. ................ 711/206 |
| 6,862,287 | B2 | | 3/2005 | Brown |

(Continued)

OTHER PUBLICATIONS

U.S. Appl. No. 13/617,290, entitled Facilitating Insertion of Device MAC Addresses Into a Forwarding Database, filed Sep. 14, 2012.

*Primary Examiner* — Min Jung
(74) *Attorney, Agent, or Firm* — Patterson & Sheridan, LLP (57) ABSTRACT

Techniques are disclosed for hash-based routing table management in a distributed network switch having multiple switch modules. Upon determining that an attempt to insert a first routing entry into a first hash table of the routing table has failed, a second routing entry, which exists in the first hash table, is attempted to be moved to a second hash table of the routing table. If the move attempt is successful, then the first routing entry is added to the location previously occupied by the second routing entry. If the move attempt is unsuccessful, then a third routing entry, which exists in the first hash table, is attempted to be moved.

8 Claims, 7 Drawing Sheets

(56) References Cited

U.S. PATENT DOCUMENTS

| | | |
|---|---|---|
| 6,980,547 B1 | 12/2005 | Gally et al. |
| 7,593,953 B1 | 9/2009 | Malalur |
| 7,653,059 B1* | 1/2010 | Slaughter et al. ............. 370/392 |
| 2004/0156362 A1* | 8/2004 | Pathi et al. .................... 370/389 |
| 2005/0141519 A1* | 6/2005 | Rajgopal et al. ......... 370/395.32 |
| 2007/0237153 A1* | 10/2007 | Slaughter et al. ............. 370/392 |
| 2008/0080539 A1* | 4/2008 | Hong et al. .................... 370/402 |
| 2011/0188503 A1 | 8/2011 | Hewson |
| 2014/0064091 A1* | 3/2014 | Basso et al. ................. 370/235.1 |
| 2014/0064092 A1* | 3/2014 | Basso et al. ................. 370/235.1 |
| 2014/0064282 A1* | 3/2014 | Basso et al. .................... 370/392 |

* cited by examiner

FACILITATING INSERTION OF DEVICE MAC ADDRESSES INTO A FORWARDING DATABASE

CROSS-REFERENCE TO RELATED APPLICATIONS

This application is a continuation of co-pending U.S. patent application Ser. No. 13/617,290, filed Sep. 14, 2012. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

SUMMARY

Embodiments disclosed herein provide a computer-implemented method, computer program product, and system to perform an operation for hash-based routing table management in a distributed network switch having a plurality of switch modules including a first switch module. The operation includes receiving, by the first switch module, a first frame having a source address and a destination address. The first switch module includes multiple bridge elements and a routing table, and the routing table is shared among the bridge elements in the first switch module and has multiple sets of buckets including a first set of buckets and a second set of buckets. Each set of buckets is associated with a respective hash function of multiple hash functions, and each hash function is distinct. Each bucket is configured to store multiple routing entries. The operation also includes, upon determining that an attempt to insert a first routing entry for the source address into a first bucket of the first set of buckets in the routing table is unsuccessful, moving a second routing entry from the first bucket to the second set of buckets. The operation also includes inserting the first routing entry into a first location in the first bucket previously occupied by the second routing entry.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques for hash-based routing table management in a distributed network switch having multiple switch modules. In one embodiment, a first switch module in the distributed network switch receives a first frame having a source address and a destination address. The first switch module has multiple bridge elements and a routing table, and the routing table in the first switch module is shared among the bridge elements and has multiple sets of buckets including a first set of buckets and a second set of buckets. Each set of buckets is associated with a respective hash function of multiple hash functions, and each hash function is distinct. Each bucket is configured to store multiple routing entries. Upon determining that an attempt to insert a first routing entry for the source address into a first bucket of the first set of buckets in the routing table is unsuccessful, a second routing entry is moved from the first bucket to the second set of buckets, and the first routing entry is inserted into a first location in the first bucket previously occupied by the second routing entry. Doing so facilitates insertion of routing entries into the routing table at least in some cases.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
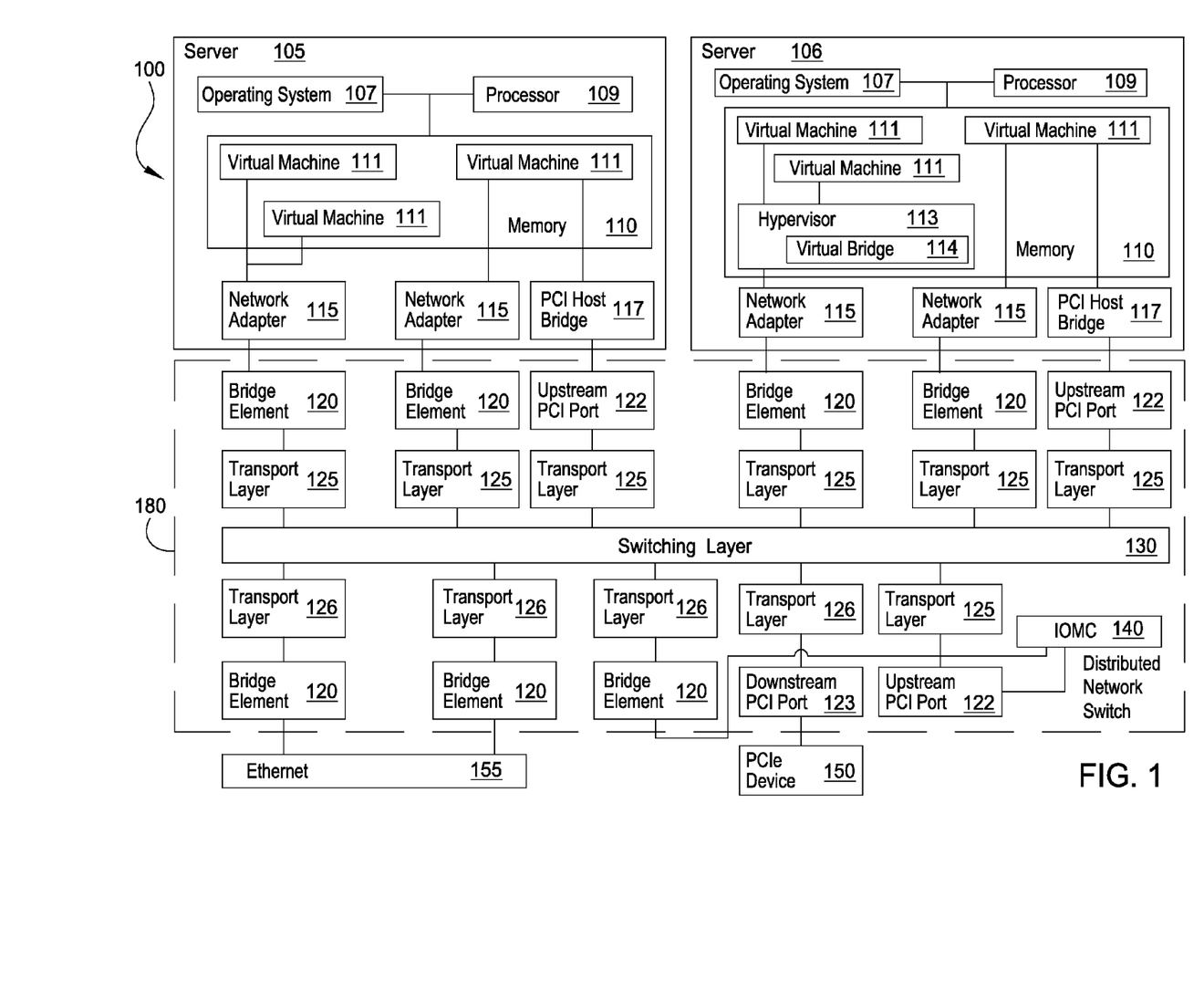
FIG. 1 illustrates a system architecture that includes a distributed network switch, according to one embodiment disclosed herein.

FIG. 1 illustrates a system architecture that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120, also referred to herein as bridging elements. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the distributed network switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130.

Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

Figure 2:
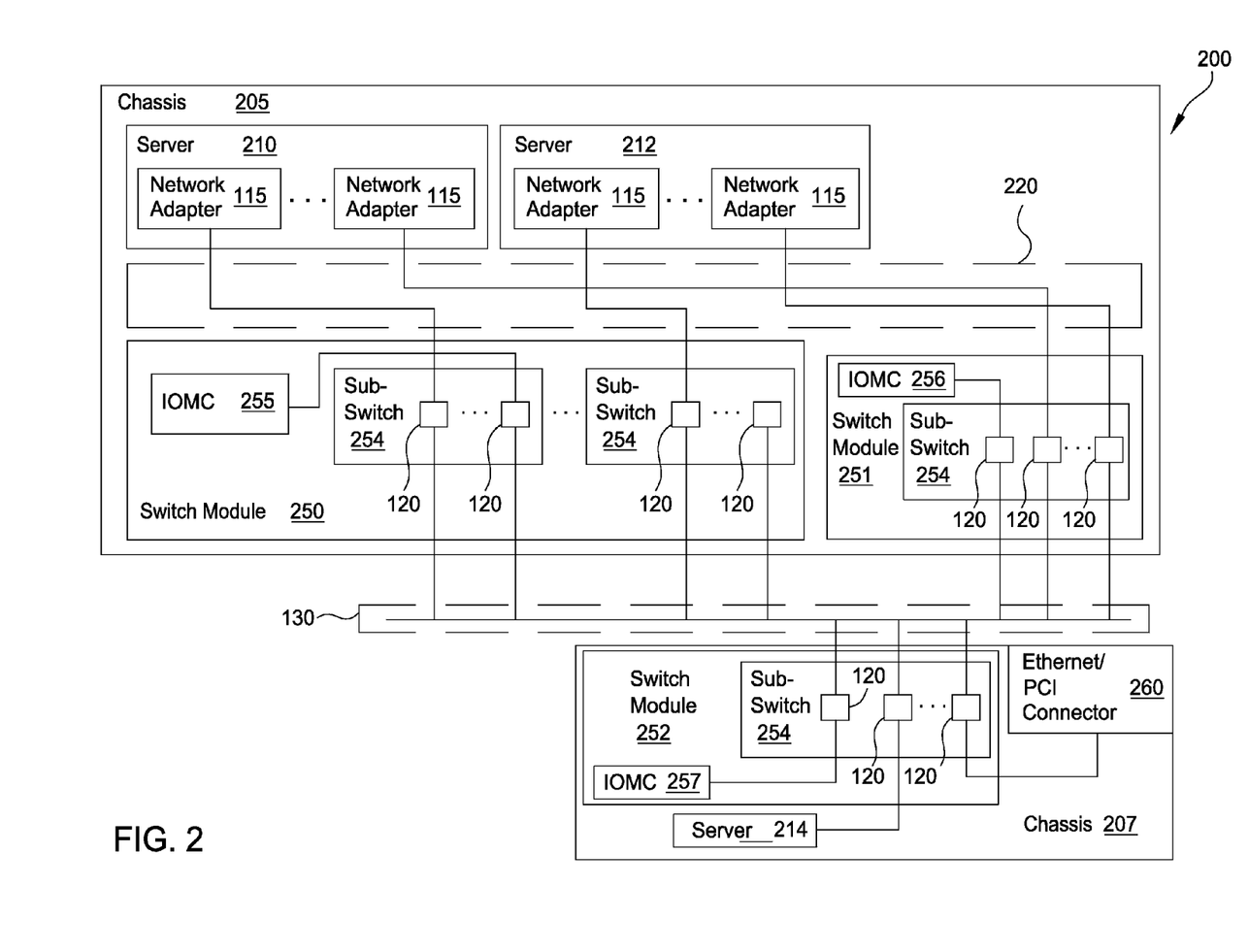
FIG. 2 illustrates a hardware representation of a system that implements the distributed network switch, according to one embodiment disclosed herein.

FIG. 2 illustrates a hardware level diagram of the system 100, according to one embodiment disclosed herein. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
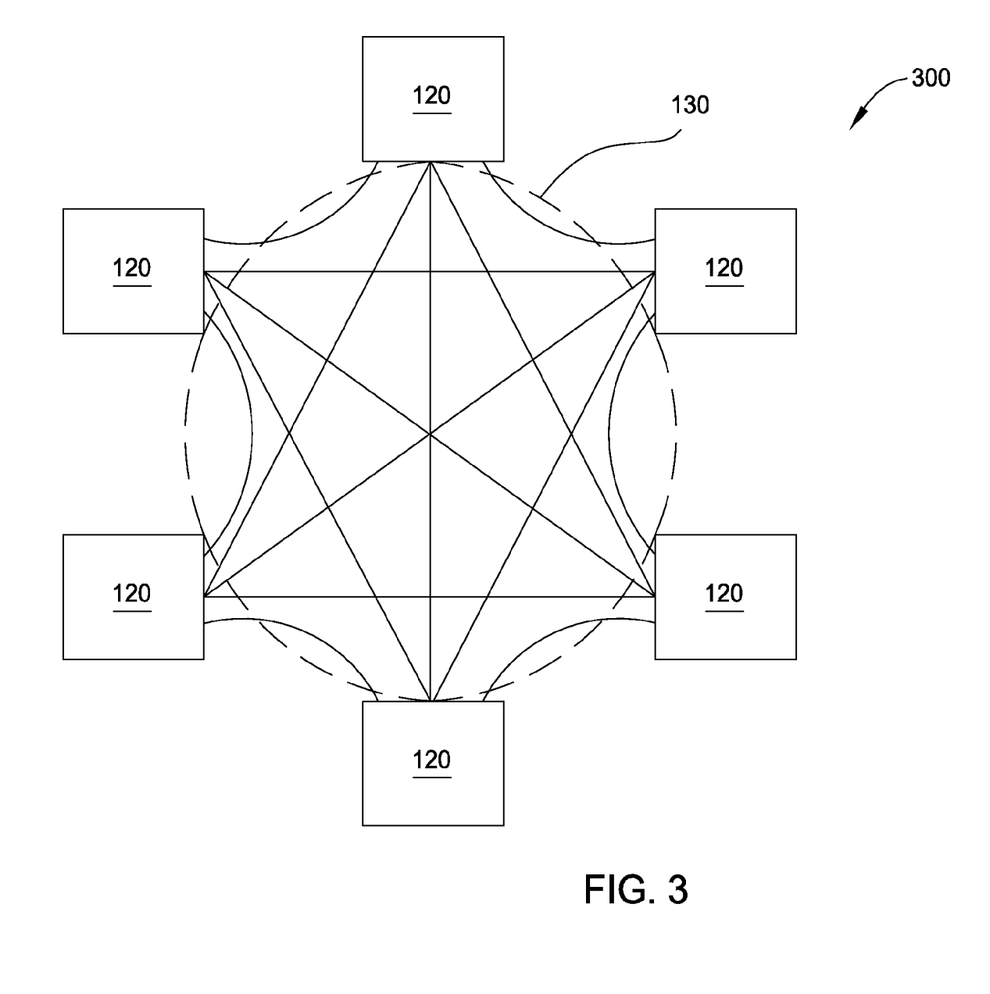
FIG. 3 illustrates components of the distributed network switch, according to one embodiment disclosed herein.

FIG. 3 illustrates a virtual switching layer, according to one embodiment disclosed herein. Each bridging element 120 in the systems 100 and 200 are connected to each other using the switching layer 130 via a mesh connection schema. That is, no matter the bridging element 120 used, a cell (i.e., data packet) can be routed to another bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this invention is not limited to any particular technique for interconnecting the bridging elements 120.

Accordingly, the distributed network switch disclosed herein is configured to provide Layer 2 Ethernet switching via: multiple switch modules 250, 251, the LRI interconnecting the switch modules 250, 251, and management firmware executing on a management controller such as the IOMC 255, 256, 257. Doing so may eliminate the need for stand-alone Ethernet switches to interconnect processing elements in the servers 105, 106. At least in some embodiments, the networked system may also be augmented in a granular and/or scalable manner by adding individual components such as switch modules and/or processing elements.

In one embodiment, each switch module 250, 251 is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 4:
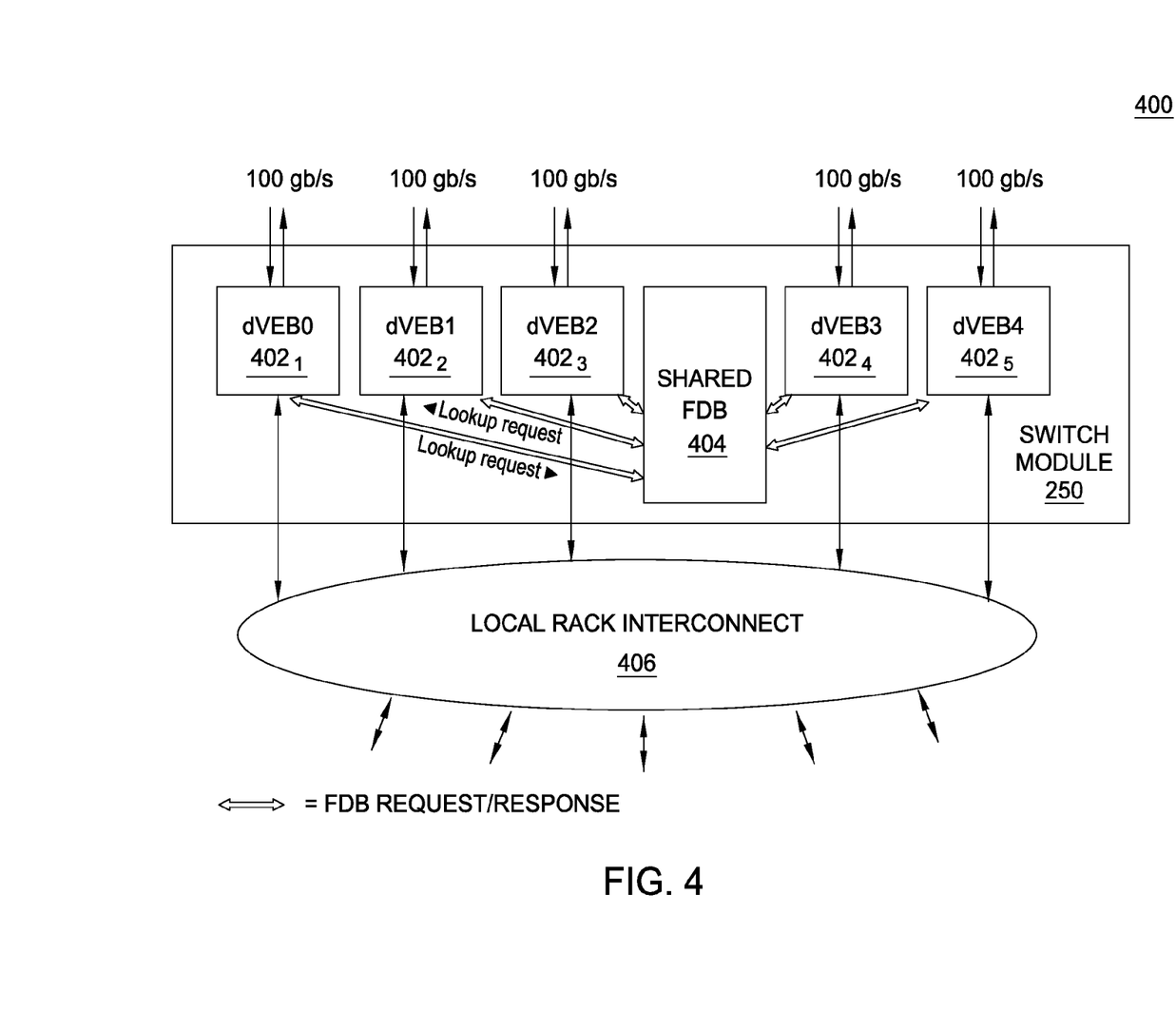
FIG. 4 is a block diagram depicting components of a switch module of the distributed network switch, according to one embodiment disclosed herein.

FIG. 4 is a block diagram depicting components of the switch module 250 of FIG. 2, according to one embodiment disclosed herein. As shown, the switch module 250 includes multiple bridge elements $402_{1-5}$ and a routing table 404 shared between the multiple bridge elements, also referred to as a forwarding data base (FDB). In this particular example, the bridge elements $402_{1-5}$ are dVEBs. Further, as described above, each switch module is operatively to an LRI 406. Each bridge element $402_{1-5}$ is configured to send a routing information lookup request to the routing table 404, and routing table 404 is configured to send a routing information lookup response to the requesting bridge element.

In one embodiment, responsive to an Ethernet frame entering an ingress port, the switch module accesses the routing table to determine if the source and/or destination addresses are present in the routing table. For example, each bridge element $402_{1-5}$ generates a destination address lookup and a source address lookup per frame to the routing table. Each bridge element $402_{1-5}$ then uses routing information received from the lookups to send the frame to the destination. At least in some embodiments, it is desirable that such lookups have direct access to a complete set of learned routing information in the distributed network switch. If only a subset of the routing information is cached locally, such as is further described below, the switch module may need to query a non-local routing table, introducing additional latency and/or complexity to the lookups. On the other hand, the complete set of learned routing information quickly become large when virtualization is used.

For example, a networked system having 640 server nodes each configured to support 256 MAC addresses results in 163,840 possible MAC addresses that need to be accounted for within the networked system. To facilitate managing routing tables of sufficient size to accommodate such networked systems, the routing tables may be shared among bridge elements as described herein—as opposed to each bridge element having its own respective routing table. Any routing table indexing scheme used should take into account the size of the MAC addresses, e.g., 48 bits in length, and any property of the MAC addresses, such as the property of having no inherent ordering. Further, as Ethernet link speeds increase, such as to 100 Gbit/s and beyond, in order to keep up with 64-byte Ethernet frames, a frame needs to be handled every 6.72 nanoseconds on each port, including two address lookups per frame. Additional routing table processing bandwidth per frame is also desirable to perform other operations such as management and refresh operations. At least in some embodiments, lookup responses are received by a switch module in the same order as the lookup requests were previously sent by the switch module.

Figure 5:
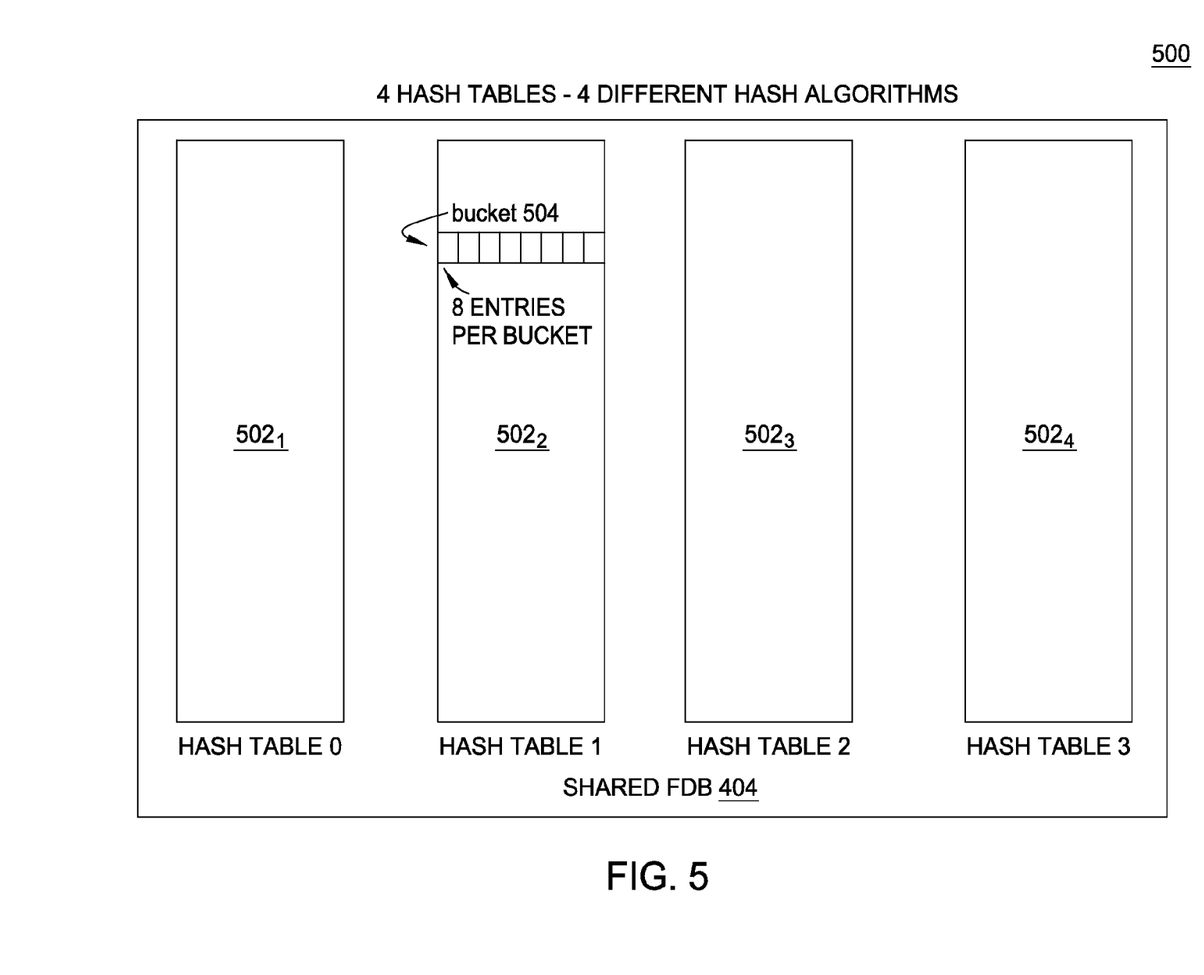
FIG. 5 is a block diagram depicting components of a routing table of the switch module, according to one embodiment disclosed herein.

FIG. 5 is a block diagram depicting components of the routing table 404 of FIG. 4, according to one embodiment disclosed herein. As shown, the routing table 404 includes a predetermined number of hash tables $502_{1-4}$, each hash table $502_{1-4}$ having a predetermined number of buckets, such as bucket 504, and each bucket being configured to store up to a predetermined number of routing entries configured to store routing information. In some embodiments, the size of the routing table 404 is predetermined to yield a routing table storage utilization of 50% or lower, based on a current number of routing entries expected. Further, each hash table may be implemented as a separate array. Further, each bucket is identifiable via a bucket identifier that is distinct within the hash table of the respective bucket.

In one embodiment, each hash table $502_{1-4}$ is associated with a distinct hash function. At least in some embodiments, the distinct hash functions are used to reduce a frequency of collisions of routing table entries. To this end, one or more of the hash functions may be chosen based on a determined or estimated collision property representing a frequency of collisions of routing table entries for a predefined set of distinct inputs. The collision property may also be referred to herein as an intra-hash collision property. Further, one or more of the hash functions may be chosen based on a determined or estimated avalanche property of the respective hash function. A hash function is regarded as having a strong avalanche property if a small change to the input to the hash function results in a large change in the output. For example, a hash function is said to have a strong avalanche property if a change in a single bit of the input results in many bits being changed in the output.

Additionally or alternatively, in one embodiment, each hash function may be chosen based on a determined or estimated inter-hash collision property such that any two distinct inputs yielding a collision in a given hash table should not yield a collision in any of the other hash tables—or should collide in as few of the other hash tables as possible. In other words, any two distinct inputs hashing to a single bucket in one hash table should not hash to a single bucket in any of the other hash tables. At least in some embodiments, the distinct hash functions are chosen to minimize the number of two distinct inputs hashing to a single bucket in multiple hash tables. Each of the intra-hash collision property, the inter-hash collision property, and the avalanche property may be determined or estimated by applying the hash function to a predefined set of inputs or based on one or more predefined property estimation rules.

Further, in one embodiment, each hash function may be cryptographic or non-cryptographic. Examples of non-cryptographic hash functions include, without limitation, Pearson hash function, Fowler-Noll-Vo hash function, Zobrist hash function, Jenkins hash function, Bernstein hash function, elf64 hash function, MurmurHash function, SpookyHash function, and CityHash function. Examples of cryptographic hash functions include, without limitation, Gosudarstvennyi Standard Soyuza SSR (GOST) hash function, Hash of Variable Length (HAVAL) hash function, message digest algorithm hash function (such as MD2, MD4, and MD5), PANAMA hash function, RadioGatun hash function, RACE Integrity Primitives Evaluation Message Digest (RIPEMD) hash function, secure hash algorithm (SHA) hash function, Tiger hash function, and Whirlpool hash function.

In one embodiment, a routing entry is inserted, updated, and/or retrieved into a given hash table, by using the hash function associated with the given hash table to generate a hash value based on a routing key of the routing entry. The hash value may then be used as a bucket identifier to identify a bucket of the hash table associated with the hash function used. In some embodiments, a hash value from each hash function is generated using the routing key, and the identified buckets, also referred to herein as candidate buckets, are evaluated to determine a least-full bucket (i.e., among the candidate buckets), into which the routing entry is then inserted. At least in some embodiments, if multiple candidate buckets are tied for being least-full, then the designated component selects the candidate bucket belonging to the least-full routing table.

In one embodiment, if the least-full bucket is nevertheless full, an existing routing entry in the least-full bucket is discarded, in order to make room for inserting the new routing entry. In some embodiments, the discarded routing entry is not reinserted into any of the hash tables. This stands in contrast to some alternative approaches for hash table management, e.g., cuckoo hashing. In other embodiments, the discarded routing entry is reinserted into one of the hash tables using the same mechanism—i.e., by generating a hash value from each hash function and identifying the least-filled bucket, into which the discarded routing entry is inserted. At least in some embodiments, each routing entry includes a flag indicating whether the respective routing entry is valid. In such embodiments, a routing entry may be discarded by setting the flag to indicate that the routing entry is invalid.

In one embodiment, the routing key has Layer-2 routing information including a virtual local area network (VLAN) tag, a logical network (LN) identifier, and a media access control (MAC) address, each of which is further described below. The VLAN tag may indicate an assigned VLAN, which may be used to segregate traffic and to allow more than one uplink. There may be multiple VLANs on a single uplink. In some embodiments, each VLAN uses only one uplink port. In other words, only one physical uplink port may be used at any given time to forward a data frame associated with a given VLAN. In other embodiments, through the use of logical networks, a VLAN may use multiple physical ports to forward traffic while also maintaining traffic separation. Further, link aggregation may be used to bundle several physical links to act as one uplink with increased bandwidth.

In one embodiment, each logical network may have a respective LN identifier and may include a respective, logically specified network portion of the distributed network switch. Further, multiple logical networks may be included within a single bridge element. As such, a logical network may provide an additional layer of traffic separation. When so configured, logical networks may allow different clients to use the same VLAN tag. The VLANs of each client may remain segregated by virtue of the different logical networks.

In some embodiments, the MAC address may be generated and assigned by a Fibre Channel Forwarder (FCF), which may be a component of a controlling bridge operatively connected to the LRI 406. An FCF, also referred to herein as an FCoE switch, is configured to facilitate connectivity between FCoE initiators and Fibre Channel fabrics. For example, an FCoE data frame sent from a first virtual machine and intended for a second virtual machine may be addressed to the FCF in accordance with the FCoE standard. The FCF may receive and readdress the FCoE data frame for forwarding to the second virtual machine. The MAC address of the FCF may have been learned by the first server 105 during a discovery phase, when the FCF establishes communications with networked devices. During the discovery phase, the second server 106 may respond to broadcast queries from the first server 105. The FCF may discover the second server based on the query responses. After the discovery phase, a login phase may be initiated. A MAC address of the second server 106 may be reassigned by the FCF. The reassigned MAC address may be used for subsequent routing and communications between the servers 105, 106. The FCF may facilitate storage of MAC addresses assigned to the servers 105, 106.

At least in some embodiments, the routing table of each switch module serves as a standalone routing table in its own right and does not operate as a cache of any global routing table. In some alternative embodiments, however, the routing tables of each switch module may have a format similar to a global routing table of the controlling bridge operatively connected to the LRI 406. In such embodiments, the routing table of a given switch module may effectively serve as a local cache for a subset of entries of the global routing table of the controlling bridge. The routing tables may have a smaller capacity than the global routing table of the controlling bridge. The routing tables may be updated with routing information learned as a result of data frames flowing through the bridge elements of the distributed network switch.

In one embodiment, the routing tables may additionally be updated with routing information from the global routing table. For example, a given bridge element may receive a data frame that includes a destination MAC address that is not found in the routing table local to the given bridge element. To obtain routing information for forwarding the data frame, the bridge element may send a query to a second bridge element configured to access the controlling bridge. The second bridge element may search the global routing table for routing information associated with the destination MAC address. If the routing information is found in the global routing table, the second bridge element may forward the routing information through the distributed network switch and to the querying bridge element. The querying bridge element may store the routing information within the routing table local to the querying bridge element. Further, added, updated, or invalidated routing information in one or more of the routing tables may also be propagated to the global routing table of the controlling bridge. For example, a bridge element may send an update message to the controlling bridge in response to learning an updated or new MAC address. The global routing table may then be updated to reflect the updated or new MAC address.

Figure 6:
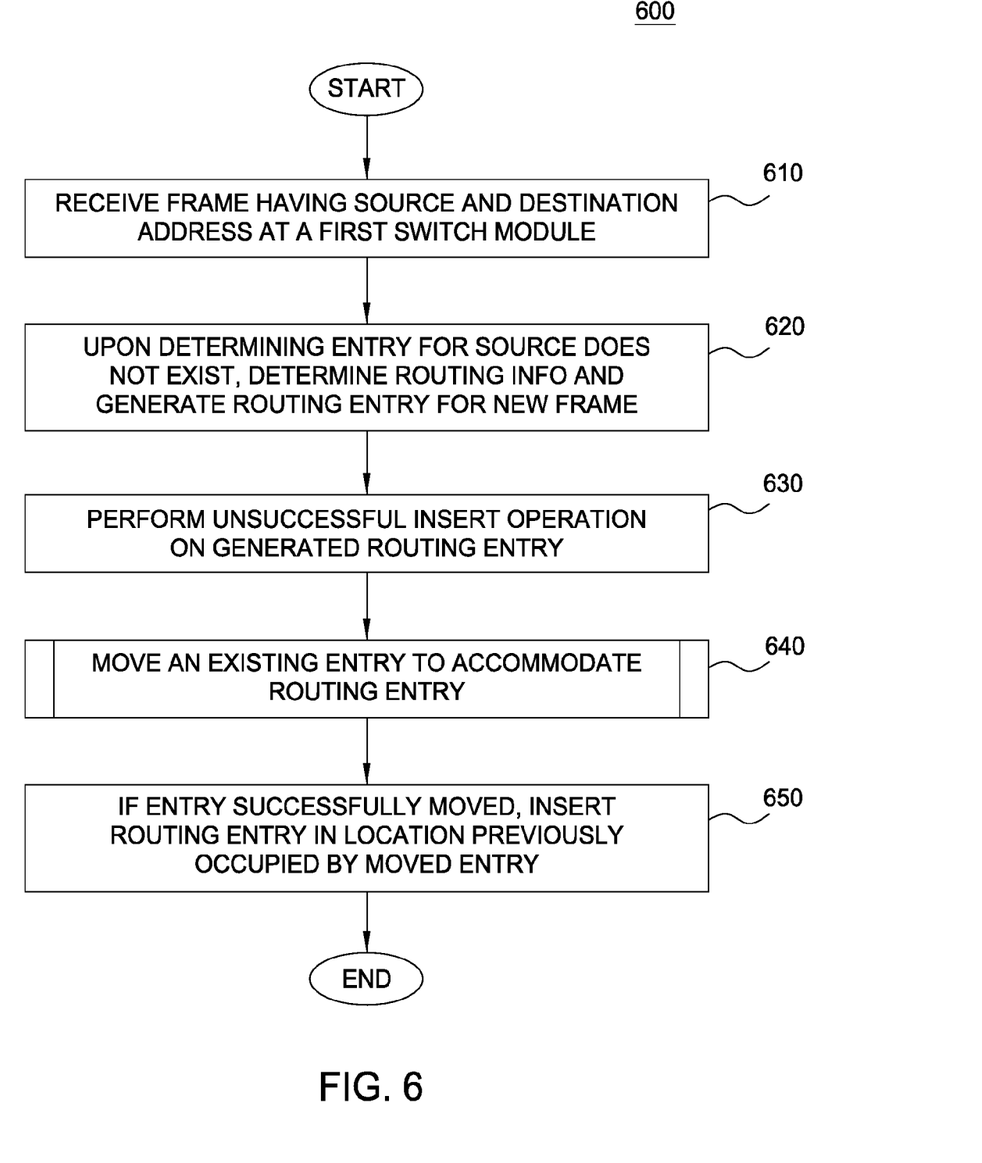
FIG. 6 is a flowchart depicting a method to facilitate hardware MAC address insertion into a forwarding database, according to one embodiment disclosed herein.

FIG. 6 is a flowchart depicting a method 600 to assist hardware MAC address insertion into a forwarding database, according to one embodiment disclosed herein. The method 600 may be performed by a designated component of the distributed network switch. The method 600 begins at step 610, where a first switch module of the distributed network switch receives a frame having a source address and a destination address. The first switch module includes bridge elements and a routing table. The routing table is shared among the bridge elements and includes sets of buckets. Each set of buckets is associated with a respective, distinct hash function. Each bucket is configured to store up to a predetermined number of routing entries. Further, each bucket in each set of buckets is identifiable by a bucket identifier that is distinct within the respective set of buckets. In one embodiment, each set of buckets is implemented as a respective hash table, and the hash tables together form the routing table of the first switch module. In one embodiment, the first switch module has a routing table including four hash tables, each with a distinct, respective hash function, each hash table having a plurality of buckets, each bucket containing eight routing entries.

At step 620, upon determining that the routing table in the first switch module does not include any routing entry for the source address, the designated component determines routing information for the source address and generates a routing entry for the source address based on the determined routing information. At step 630, the designated component of the first switch module performs or requests to perform an insert operation on the generated routing entry. In one embodiment, in attempting to perform an insert operation on the generated routing entry, the designated component generates four hash values using each of the four respective hash functions based on a routing key included within a header of the first frame. Upon generating the four hash values, the designated component identifies a bucket in each hash table having a bucket identifier matching the generated hash value. Of the four identified buckets, the designated component identifies a first bucket, which in some embodiments may be determined to be the bucket having the least number of entries, in which to insert the generated routing entry. In some embodiments, the insert operation is unsuccessful because the selected bucket is full of valid "static" routing entries. A static routing entry is a permanent entry entered by software which cannot be removed (e.g., cannot be dropped or deleted). The designated component may then select each of the remaining three identified buckets, each of which may also be full of static routing entries. Without a free entry in the bucket in which to insert the generated routing entry, the insert operation is thus far unsuccessful.

At step 640, the designated component attempts to move an existing entry in one of the identified buckets, selected at random, to another hash table, in order to create a free entry in which to insert the generated routing entry. Step 640 is discussed in greater detail below with reference to FIG. 7. At step 650, if an entry is successfully moved, the generated routing entry is inserted into the location previously occupied by the moved entry. If no entries from the randomly selected are successfully moved, the insert operation fails.

Depending on the embodiment, the functionality of attempting to move a routing entry to accommodate the generated routing entry may be implemented as part of the routing entry insert operation or separately from the routing entry insert operation. If implemented as part of the routing entry insert operation, the functionality of attempting to move a routing entry is invoked upon determining that the routing entry insert operation is unsuccessful. If implemented separately from the routing entry insert operation, the functionality is invoked when the routing entry insert operation is partially unsuccessful, and the routing entry insert operation is not considered to be unsuccessful unless the functionality itself is also unsuccessful—i.e., no routing entry can be moved to accommodate the generated routing entry.

Figure 7:
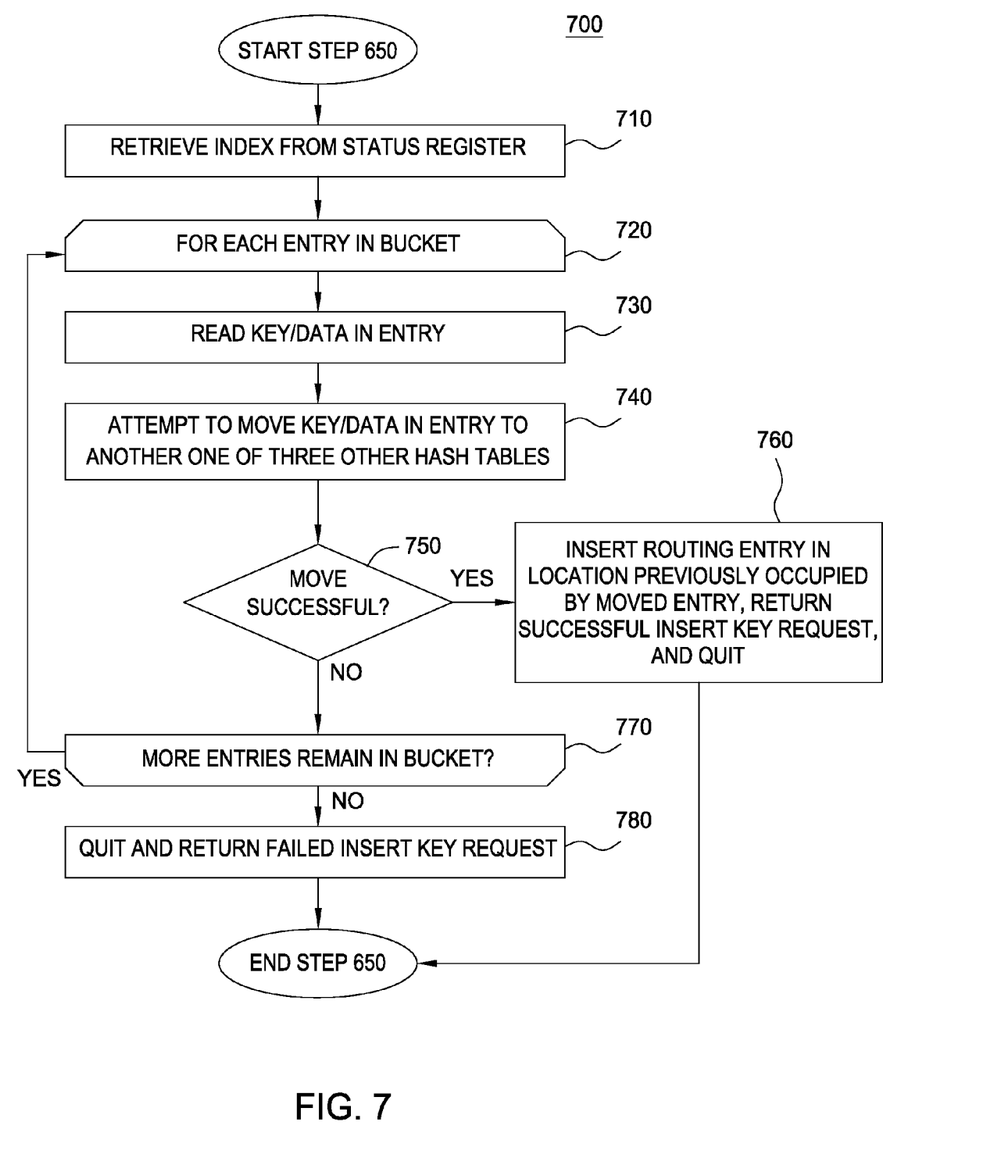
FIG. 7 is a flowchart depicting a method to move an existing routing table entry to accommodate a new routing table entry, according to one embodiment disclosed herein.

FIG. 7 is a flowchart depicting a method 700 corresponding to step 650 to move an existing routing table entry to accommodate a new routing table entry, according to one embodiment disclosed herein. The steps of the method 700 may be performed by a designated component of the distributed network switch. At step 710, the designated component retrieves an index from a status register. When an insert operation is unsuccessful, an index pointer is stored in an IOMC status register. The index points to one of the eight routing entries in one of the four buckets that the routing key hashes to. Both the bucket and the routing entry may be selected at random by the designated component, although any suitable technique may be used to select a bucket and a routing entry in the bucket.

At step 720, the designated component begins executing a loop containing steps 730-780 for each routing entry in the selected bucket. The first iteration of the loop is performed on the bucket and routing entry pointed to by the index in the status register retrieved at step 710. At step 730, the designated component reads, from the routing table, the key field and its corresponding data field from the current entry in the selected bucket. In some embodiments, the designated component may check the validity of the data in the current entry. The data in the current entry may not be valid because the designated component may have invalidated the entry in the time between the unsuccessful insertion attempt at step 630 and when the entry was read at step 730. In such embodiments, if the data is not valid, the original insert may now be completed successfully into the location occupied by the invalid data. Therefore, in such a scenario, the designated component may successfully insert the routing entry generated at step 620 into the current (invalidated) routing entry without having to move any routing entries.

At step 740, the designated component attempts to move the contents (e.g., key field and data field) from the current routing entry in the selected bucket to one of the other hash tables. The contents of the current routing entry may be moved successfully because the hash value generated by the hash function of one of the other hash tables may be significantly different than the hash value generated by the hash function of the current hash table, such as due to the avalanche property of the hash functions described above. At step 750, the designated component determines whether the attempted move is successful. If the move is successful, the method proceeds to step 760, where the designated component inserts the generated routing entry in the bucket entry previously occupied by the moved routing entry. Upon successfully inserting the generated routing entry, a successful insert key request message is returned, and the method 700 terminates.

If, at step 750, the attempted move is not successful, the method proceeds to step 770, where the designated component determines whether other entries remain in the bucket which contents have not been subject to an attempted move. For example, the index may be incremented by one (modulo 8) at each pass through the loop, and if a count of move attempts is less than nine, additional entries remain. If additional entries remain, the method returns to step 720. If no additional entries remain, then it is understood that an unsuccessful move operation has been attempted on each entry in the bucket, and the method proceeds to step 780. At step 780, the designated component quits (i.e., ceases attempts to insert the routing key), returns a failed insert key request, and the method 700 terminates.

Embodiments disclosed herein assist the switch modules to insert routing keys which insert attempts have otherwise failed. The switch modules are so assisted in an effort to prevent a subsequent flooding of packets throughout the distributed network switch. For example, if an routing entry is not located in the forwarding database, when a packet without a corresponding destination is later received, the packet will be broadcast over the VLAN domain, which could negatively affect performance of the distributed network switch at least in some cases.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of hash-based routing table management in a distributed network switch comprising a plurality of switch modules including a first switch module, the method comprising:
   receiving, by the first switch module, a first frame having a source address and a destination address, wherein the first switch module comprises a plurality of bridge elements and a routing table, wherein the routing table in the first switch module is shared among the plurality of bridge elements in the first switch module and comprises a plurality of sets of buckets including a first set of buckets and a second set of buckets, wherein each set of buckets is associated with a respective hash function of a plurality of hash functions, wherein each hash function is distinct, wherein each bucket is configured to store a plurality of routing entries; and
   upon determining that an attempt to insert a first routing entry for the source address into a first bucket of the first set of buckets in the routing table is unsuccessful and by operation of one or more computer processors:
      moving a second routing entry from the first bucket to the second set of buckets; and
      inserting the first routing entry into a first location in the first bucket previously occupied by the second routing entry.

2. The computer-implemented method of claim 1, wherein the first set of buckets is a first hash table, wherein the second set of buckets is a second hash table, wherein the unsuccessful insert attempt causes an index to be set in a status register, wherein the index specifies the first bucket and the second routing entry, wherein the first bucket and the second routing entry are randomly selected, wherein moving the second routing entry comprises:
   reading the first bucket and the second routing entry from the status register before attempting to move the second routing entry;
   retrieving a key value and a data field of the second routing entry from the routing table; and
   moving the key value and the data field of the second routing entry to the second hash table.

3. The computer-implemented method of claim 1, wherein the attempt to insert the first routing entry is determined to be unsuccessful based on a respective bucket of each hash table in which the first entry was attempted to be inserted being filled by static routing entries, which cannot be removed.

4. The computer-implemented method of claim 1, further comprising, upon determining that moving the second routing entry was unsuccessful:
   moving a third routing entry from the first bucket to the second hash table; and
   inserting the first routing entry into a second location in the first bucket previously occupied by the third routing entry.

5. The computer-implemented method of claim 4, wherein each set of buckets is a respective hash table, wherein the hash tables together constitute the routing table in the first switch module.

6. The computer-implemented method of claim 5, wherein an unsuccessful attempt to move an entry from the first bucket results in a subsequent attempt to move another entry from the first bucket, wherein each entry in the first bucket is attempted to be moved, wherein the insert operation is successful when an entry in the first bucket is moved and the first routing entry is inserted in its place, wherein the insert operation fails upon determining no entries in the first bucket have been successfully moved.

7. The computer-implemented method of claim 6, wherein each of the plurality of routing entries is configured to store a routing key included within a header of the first frame, wherein the routing key includes Layer-2 (L2) routing information comprising a virtual local area network (VLAN) tag, a logical network (LN) identifier, and a media access control (MAC) address.

8. The computer-implemented method of claim 7, wherein each bucket in each set of buckets is uniquely identifiable by a respective bucket identifier that is distinct within the respective set of buckets, wherein a respective hash value is generated using the hash function associated with each set of buckets based on the routing key, wherein a candidate bucket in each set of buckets is identified as having a bucket identifier matching the hash value generated using the hash function associated with the respective set of buckets.

* * * * *